L. E. KLUG.
PROCESS AND APPARATUS FOR THE MANUFACTURE OF RUBBER JARS.
APPLICATION FILED DEC. 29, 1920.
1,394,558.
Patented Oct. 25, 1921.
2 SHEETS—SHEET 1.
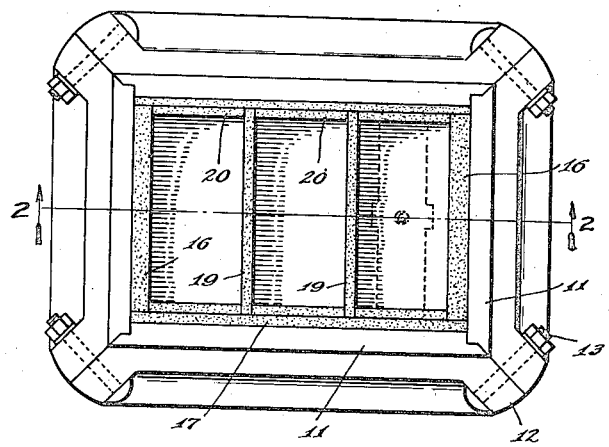
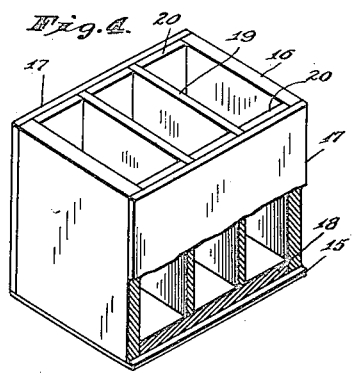
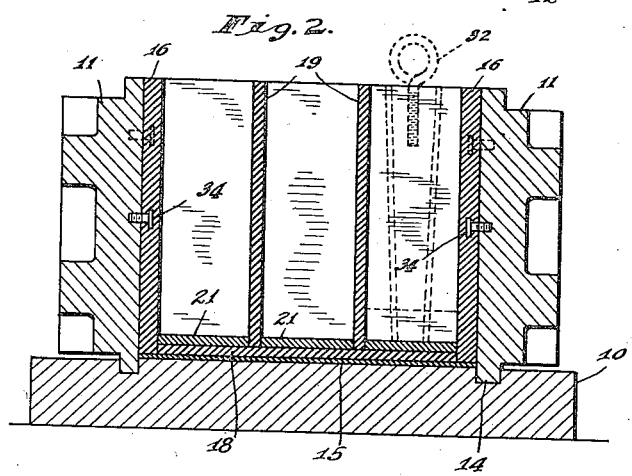
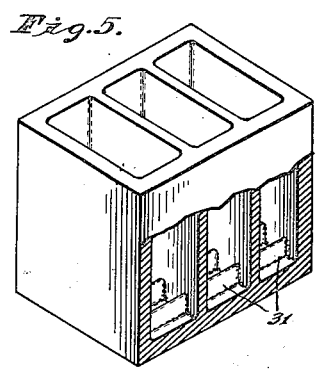
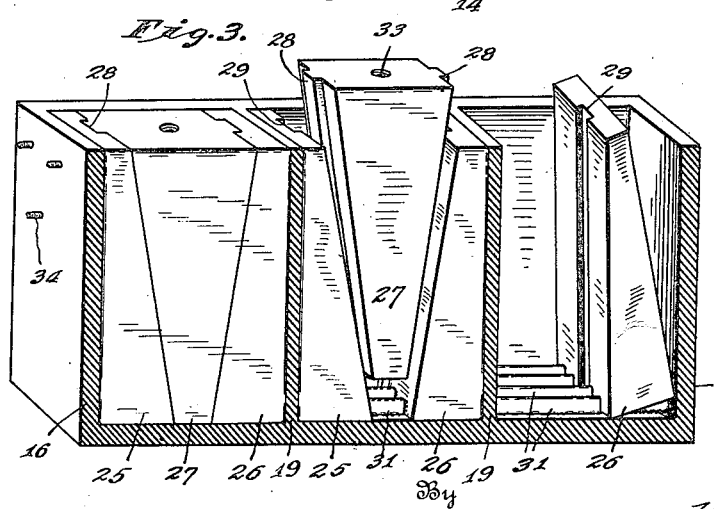
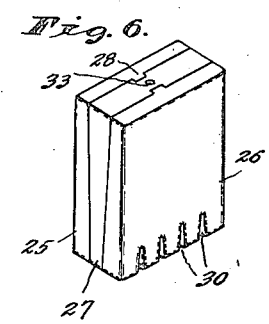
Inventor
Louis E. Klug,
By
Hood & Schley
Attorneys L. E. KLUG.
PROCESS AND APPARATUS FOR THE MANUFACTURE OF RUBBER JARS.
APPLICATION FILED DEC 29, 1920.
1,394,558.
Patented Oct. 25, 1921.
2 SHEETS—SHEET 2.
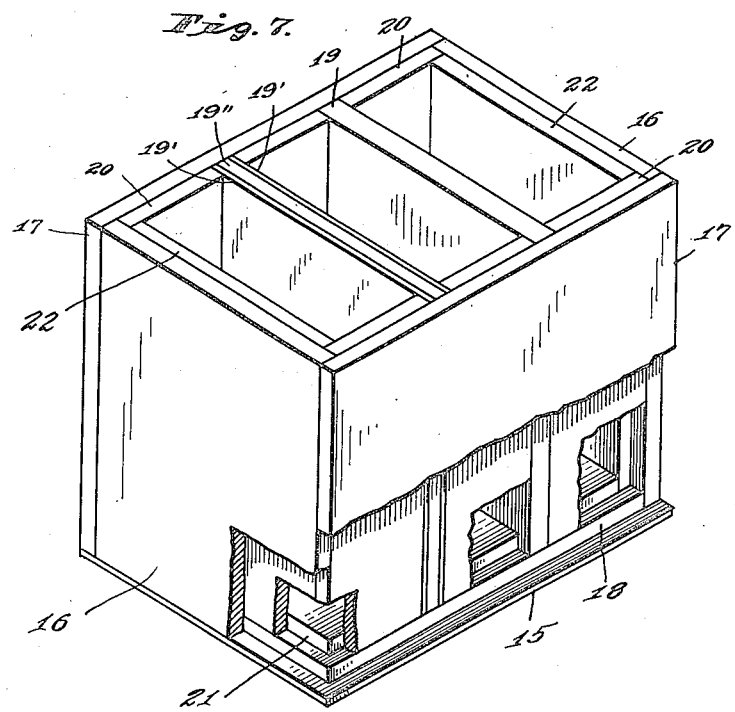
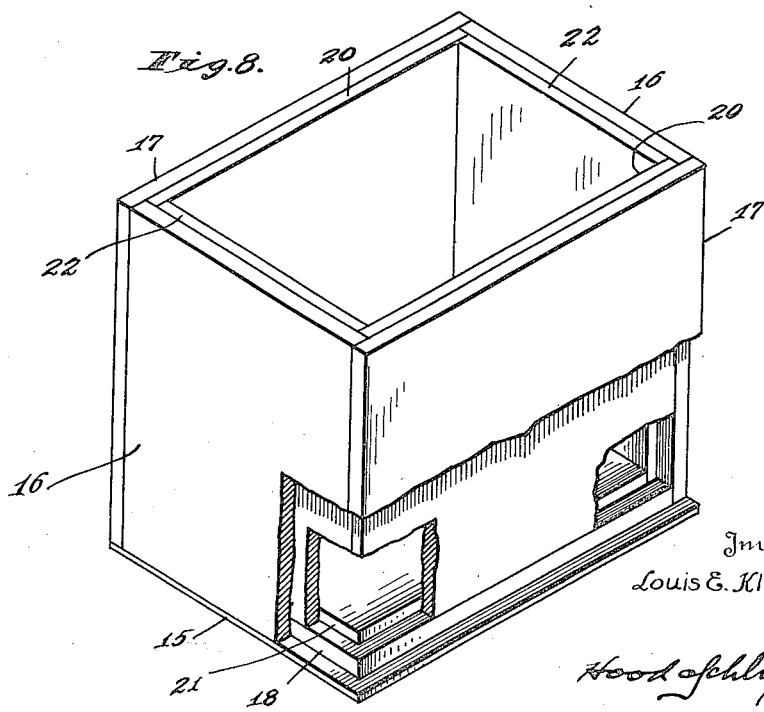

UNITED STATES PATENT OFFICE.

LOUIS E. KLUG, OF INDIANAPOLIS, INDIANA, ASSIGNOR TO RUB-TEX PRODUCTS, INC., OF INDIANAPOLIS, INDIANA, A CORPORATION OF INDIANA.

PROCESS AND APPARATUS FOR THE MANUFACTURE OF RUBBER JARS.

1,394,558.   Specification of Letters Patent.   Patented Oct. 25, 1921.

Application filed December 29, 1920. Serial No. 433,746.

*To all whom it may concern:*

Be it known that I, LOUIS E. KLUG, a citizen of the United States, residing at Indianapolis, in the county of Marion and State of Indiana, have invented a new and useful Process and Apparatus for the Manufacture of Rubber Jars, of which the following is a specification.

It is the object of my invention to produce a liquid-tight container which is impervious to and unaffected by liquids which it may contain, and in which at least the inner faces are formed of rubber or rubber composition as an integral whole under pressure sufficient to eliminate all pin holes, and which may have one or more intermediate partitions separating the container into a plurality of cells, which partitions are also of rubber or rubber composition or faced therewith and are formed integral with the remainder of the container without danger of being torn loose when the cores necessary for creating the pressure are removed, the container being particularly for use as a battery jar.

In the manufacture of the storage batteries, the several cells of a battery have ordinarily been put in separate jars, with several jars mounted in a wooden box. Attempts have been made before my invention to make a unitary plural-cell rubber-composition jar, by providing the jar with partitions which divide it into several cells; but such attempts have not been successful, and even with single-cell jars there have been difficulties in obtaining sufficient pressure to eliminate pin holes and in getting strong joints at the corners, largely for the following reasons.

To obtain sufficient pressure to avoid cavities in the rubber, commonly called pin holes or blow holes and serving to permit not only leakage of the liquid but also electric leakage if the pin holes are in partitions between cells, it is necessary to use suitably shaped cores for the interior of the cell or cells of the jar, and heretofore the pressure has been applied from the outside when applied at all; but it has heretofore been practically impossible to remove such cores, even when tinfoil is used to separate them from the rubber, because in attempting to remove them the corners and edges of the box would frequently be broken and any partitions which were provided would almost certainly be torn loose.

In carrying out my invention, I use a special core by which I obtain great pressure during vulcanization, thus avoiding pin holes, and at the same time make it possible to remove the core without strain on parts of the jar, even on the partitions when they are provided. If the jar has more than one cell, I use my special core in each cell. This core is a three-part core, of which the center part is of keystone shape, and I force this keystone part gradually into place between the other two parts of the core during the vulcanizing operation to force such other core-parts apart to produce great pressure on the rubber during vulcanization, thus causing the sheets of rubber used in building up the jar to unite into an integral whole as they are vulcanized and to unite with any outer casing, as of wood, if such a casing is provided; and in order to make the joints more solid, I provide step joints at the corners and edges and mortise joints at the edges of the partitions when partitons are used, ordinarily making such joints by the use of several suitably arranged layers of the rubber or rubber-and-fiber composition used; this produces a laminated structure which further assists in preventing leakage because if any pin holes exist in adjacent layers they will not register. The special cores used not only create great pressure as their keystone parts are forced inward during vulcanization, but are also easily released to relieve the pressure by withdrawing the keystone parts first, after which the other core-parts may readily be separated from the inner walls, and especially from the partitions, without producing any tendency to rupture the jar or tear loose the partitions. The entire jar may be made of rubber or rubber-and-fiber composition, as desired, or the body of the jar may be of some other material with only an inner lining or veneer of such rubber or rubber-and-fiber composition.

The accompanying drawings illustrate my invention: Figure 1 is a plan of a mold with the initial composition-sides in place in accordance with my invention, and with the three core-parts of one cell indicated in dotted line; Fig. 2 is a section on the line 2—2 of Fig. 1; Fig. 3 is a perspective section through a complete plural-cell battery jar made in accordance with my invention, taken just inside one of the side walls, and showing the core parts in different positions for the several cells to indicate the interaction of such core-parts; Fig. 4 is a perspective view, in partial section, of the assembled composition-sides for a plural-cell jar, with a two-layer bottom; Fig. 5 is a perspective view similar to Fig. 4, showing the completed jar, after vulcanizing; Fig. 6 is a perspective view of the three-part core for one of the cells; Fig. 7 is a perspective view similar to Fig. 4, showing the assembled parts of a plural-cell jar before vulcanization, with a complete internal veneering provided, the outer parts being either of the same material or different material; and Fig. 8 is a perspective view somewhat similar to Fig. 7, but showing only a single-cell jar.

In making the jar, I use an outer mold and one or more special cores. The outer mold comprises a base 10 and four separate side and end walls 11, the side and end walls being provided at their ends with oblique flanges 12 whereby they may be clamped together by bolts 13, and being provided on their lower edges with tongues 14 which are removably inserted in corresponding grooves in the upper face of the base 10. By removing the bolts 13, the side and end walls may be swung out and lifted from the base 10.

The battery jar is built up in the assembled outer mold. The complete jar may be built up of separately cut sheets of the desired rubber or rubber-and-fiber composition. First a bottom sheet 15 is laid on the base 10, fitting within the side and end walls of the mold. On the bottom sheet 15 are stood the end sheets 16 and the outer side-sheets 17, preferably overlapping by having the side sheets 17 project past the edges of the end sheets 16, as is clear from Figs. 1 and 4. The side and end sheets lie against the side and end walls of the mold. Then a second bottom sheet 18 fitting within the side and end sheets may be laid on the bottom sheet 15, to provide a step joint between the bottom with the side and end sheets; or this sheet 18 may be omitted. There may be no partitions, as indicated in Fig. 8; but if partitions are to be provided, as indicated in Figs. 1 to 7 inclusive, the partition sheets 19 are then put in place, to stand vertical, with their lower edges resting on the bottom sheet or sheets and their side edges bearing against the inner faces of the outer side sheets 17. Then inner side sheets 20, each as wide as the distance between adjacent partitions or between a partition and the adjacent end wall 16, are put in place, to lie against the inner faces of the outer side sheets 17 between the partitions and end sheets, thus forming step joints between the sides and ends and tongue-and-groove joints between the partitions and sides of the complete jar. If desired, supplemental bottom sheets 21 may be put in place to lie horizontal upon the subjacent bottom sheet and to fit between the partitions and between the end walls and partitions, as indicated in Figs. 2 and 7; and supplemental end sheets 22 may be put in place against the inner faces of the end sheets 16, as indicated in Fig. 7. If desired these supplemental sheets 21 and 22 may be omitted, as is indicated in Fig. 4. Various assemblies of the built-up battery jar before vulcanizing are indicated in Figs. 1, 2, 4, 7, and 8; but when the vulcanization is completed the separate sheets 15 to 22 inclusive are all united into one integral structure as is indicated in Figs. 3 and 5.

The various innermost sheets 20, 21, and 22, and the partititons 19 may be of pure rubber or of a better grade of rubber than the other sheets, if desired, to provide an internal veneer, and the partitions 19 may be made with veneer surface sheets 19', of pure rubber or rubber of better grade than their central parts 19'', as indicated in one of the partitions in Fig. 7; and, if desired, all the sheets except the innermost sheets 20, 21, and 22 and the partitions 19 or their veneer surface sheets 19' may be of something else than rubber, such as wood for example, in which case such other sheets may or may not be fastened together otherwise than by the coalescing of the rubber sheets with their adjacent parts during vulcanization.

In order to hold the parts in proper position during the vulcanizing operation, and to furnish the necessary pressure, a three-part core is inserted in each cell—that is, between the two partitions 19, and between each such partition and the adjacent end sheet 16, when partitions are used, or in the single cell (Fig. 8) when no partitions are used. All these three-part cores are similar, so that it is necessary to describe only one of them. One complete three-part core is shown in perspective in Fig. 6, and with its parts in various relative positions in Fig. 3.

Each three-part core comprises two side blocks 25 and 26, which are interchangeable, and a central keystone-shaped or wedge-shaped block 27, which fits between and has sliding engagement upon the blocks 25 and 26. The inner faces of the outer blocks 26 and 27 are suitably inclined to mate with the outer surface of the central block 27, so that the outer face of the blocks 25 and 26 will be parallel when the three blocks are together. The mating faces of the blocks 25 and 27, and 26 and 27, are preferably provided with guiding tongues and grooves 28 and 29, the tongues being provided on either the central block or the side blocks as indicated in Figs. 3 and 6 respectively, as desired. The bottom ends of the blocks 25, 26, and 27 are provided with slots 30, which widen downward to provide draft and conveniently extend parallel to the side sheets 17 and 20, to form upwardly extending ridges 31 on the bottom of the completed battery jar, as will be presently explained, to support the plates of the battery and to provide between them space for sediment.

In putting the cores in place, the two side blocks 25 and 26 are put into a cell to lie respectively against the two partitions 19 or against a partition 19 and the adjacent end sheet 16 or 22, or against the two end walls when no partitions are provided. Then the central block 27 is inserted between the two blocks 25 and 26. This is done for each cell of the battery, and initially leaves the central block or blocks 27 projecting upward somewhat above the other parts. All the blocks 25, 26, and 27 substantially fit between the opposite side sheets 20. When the cores have thus been inserted, the mold with its contents is put beneath a suitable press for operation to force further downward the central core blocks 27; all the central core blocks are forced slowly downward together. At the same time the mold and its contents are suitably heated, to make the rubber more plastic and to start the vulcanization. The pushing downward of the central core blocks 27 forces apart the blocks 25 and 26 and creates considerable pressure in the direction of the line 2—2 of Fig. 1, and because the heated rubber or rubber-and-fiber composition is somewhat plastic the rubber is caused to flow to fill up any voids and to fill up the slots 30 to form the ridges 31. This flow is not an instantaneous flow, but may continue for a long time. The mold with its contents may be removed from the press after the rubber flow has been completed, even though the vulcanization is not yet complete, and the vulcanization finished elsewhere, so that the press may be used for another mold. For the curing, of course, sulfur must be present, as by being mixed with the compound of which the sheets which are to form the jar are made. During the curing operation, the various sheets all coalesce to form an integral whole, which is dense and homogeneous, with no pin holes through it, because of the pressure created by the cores. In this integral whole the partitions 19 are firmly united to the side walls of the battery jar by reason of the mortise joints between such partitions and the sheets of which such side walls are made. Similarly, the side and end walls coalesce with the bottom, and with one another, with substantial joints. When an internal rubber veneer is used the veneer sheets coalesce with the adjacent sheets, making a substantially integral whole even though such adjacent sheets are of wood or some other non-rubber material.

When the vulcanization has been completed, and the parts have become sufficiently cool, the mold walls 11 and 12 are taken off and the cores are removed. In removing the cores, the partitions are not subjected to any great strain, for the central blocks 27 of the cores are first pulled out, by removable screw-eyes 32 which may be inserted in suitable threaded holes 33 in the upper ends of such parts, thus relieving the pressure; after which the blocks 25 and 26 are loosened from the end walls and partitions by the insertion of a knife or spatula, then tilted as indicated in the right hand cell in Fig. 3, and readily removed.

If desired, the end walls 11 of the molds may have recesses on their inner faces to loosely receive the ends of headed studs 34, the heads of which during the compression and heating will be pressed into and become embedded in the end walls 16 of the battery jar; so that when the end walls 11 of the mold are removed the threaded ends of the studs 34 are left projecting from the end walls of the battery jar, as is clear from Fig. 3. These projecting studs 34 provide a convenient means for attaching the handles of the battery.

I claim as my invention:

1. The process of making a partitioned jar, which consists in building up the bottom and walls of the jar of sheets of suitable rubber material, putting one or more partitions of rubber material in place with their edges setting in grooves in the bottom and walls, and subjecting the material to heat and pressure to produce coalescing of the partitions, walls, and bottom where they meet.

2. The process of making a partitioned jar, which consists in building up the bottom and walls of the jar of sheets of suitable rubber material, putting one or more partitions of rubber material in place with their edges setting in grooves in the walls, and subjecting the material to heat and pressure to produce coalescing of the partitions, walls, and bottom where they meet.

3. The process of making a partitioned jar, which consists in building up the bottom and walls of the jar of sheets of suitable rubber material, putting one or more partitions of rubber material in place with their edges against the walls and bottom, putting inner wall-sheets and inner bottom-sheets of suitable rubber material against the walls and bottom with their edges against the sides of the partitions near the edges of the latter, and subjecting the material to heat and pressure to produce coalescing of the partitions, walls, bottom, and inner sheets where they meet.

4. The process of making a partitioned jar, which consists in building up the bottom and walls of the jar of sheets of suitable rubber material, putting one or more partitions of rubber material in place with their edges against the walls and bottom, putting inner wall-sheets of suitable rubber material against the walls with their edges against the sides of the partitions near the edges of the latter, and subjecting the material to heat and pressure to produce coalescing of the partitions, walls, bottom, and inner sheets where they meet.

5. The process of making a jar, which consists in building up the bottom and walls of the jar of sheets of suitable rubber material with the corners formed by overlapping one part on the edge of the other, putting in supplemental sheets of rubber material against the inner face of the sheets which overlap edges so that the edges of such supplemental sheets abut against the inner face of the sheets whose edges are overlapped by others of the first-named sheets, and subjecting the material to heat and pressure to produce coalescing of the several sheets where they engage each other.

6. The process of forming a partitioned jar, which consists in building up in a mold the bottom and sides of the jar of sheets of rubber material, setting one or more partitions in place, putting in each of the cells thus formed a three-part core of which the central part is wedge-shaped, and forcing the central parts of all the cores into place between their mates and at the same time subjecting the whole to heat so that coalescing and vulcanization under pressure will be obtained.

7. The process of forming a jar, which consists in building up in a mold the bottom and sides of the jar of sheets of rubber material, putting in the cell thus formed a three-part core of which the central part is wedge-shaped, and forcing the central part of the core into place between its mates and at the same time subjecting the whole to heat so that coalescing and vulcanization under pressure will be obtained.

8. In combination, a mold for bearing against the outer surfaces of a jar to be formed of material of which the parts forming the inner surfaces are of rubber, and a plurality of spaced three-part cores for bearing against the inner surface of said jar and against partitions with which it is provided, each of said cores comprising three parts of which the middle part is wedge-shaped to force apart its two mating parts when it is pressed into position between them and thus to create pressure on the material between the mold and the core or cores and to permit such mating parts to be moved together upon the prior withdrawal of the middle part from its position between them, the mold having side walls which are arranged to permit such movement of such mating core-parts toward and from each other.

9. In combination, a mold for bearing against the outer surfaces of a jar to be formed of material of which the parts forming the inner surfaces are of rubber, and a plurality of spaced three-part cores for bearing against the inner surface of said jar and against partitions with which it is provided, each of said cores comprising three parts of which the middle part is wedge-shaped to force apart its two mating parts when it is pressed into position between them and thus to create pressure on the material between the mold and the core or cores and to permit such mating parts to be moved together upon the prior withdrawal of the middle part from its position between them, the mold having side walls which are arranged to permit such movement of such mating core-parts toward and from each other, the engaging faces of the core-parts being provided with tongues and grooves for guiding them in their relative movements.

10. In combination, a mold for bearing against the outer surfaces of a jar to be formed of material of which the parts forming the inner surfaces are of rubber, and one or more three-part cores for bearing against the inner surface of said jar and against any partitions with which it may be provided, each of said cores comprising three parts of which the middle part is wedge-shaped to force apart its two mating parts when it is pressed into position between them and thus to create pressure on the material between the mold and the core or cores and to permit such mating parts to be moved together upon the prior withdrawal of the middle part from its position between them, each of said cores being provided with one or more grooves on its face which coöperates with the bottom of the jar to provide spaces into which rubber may be pressed to form ridges projecting upward from the bottom of the jar.

11. The process of making a partitioned jar, which consists in building up the bottom and walls of the jar of sheets, putting one or more partitions of rubber material in place with their edges against the walls and bottom, putting inner wall-sheets and inner bottom-sheets of suitable rubber material against the walls and bottom with their edges against the sides of the partitions near the edges of the latter, and subjecting the material to heat and pressure to produce coalescing of the partitions, walls, bottom, and inner sheets where they meet.

12. The process of making a partitioned jar, which consists in building up the bottom and walls of the jar of sheets, putting one or more partitions in place with their edges against the walls and bottom, putting inner wall-sheets and inner bottom-sheets against the walls and bottom with their edges against the sides of the partitions near the edges of the latter, and subjecting the material to heat and pressure to produce coalescing of the partitions, walls, bottom, and inner sheets where they meet, the sheets which are exposed to the interior of the jar being of rubber material.

13. The process of forming a jar, which consists in putting the walls and bottom of the jar in a mold, setting sheets of rubber material against the inner faces of such walls and bottom, setting in place one or more partitions having their exposed parts formed of rubber material, putting in each of the cells thus formed a three-part core of which the central part is wedge-shaped, and forcing the central parts of all the cores into place between their mates and at the same time subjecting the whole to heat so that the rubber material will be vulcanized and caused to coalesce with the adjacent parts under heat and pressure.

14. The process of forming a jar, which consists in putting the walls and bottom of the jar in a mold, setting sheets of rubber material against the inner faces of such walls and bottom, putting in the cell thus formed a three-part core of which the central part is wedge-shaped, and forcing the central part of the core into place between its mates and at the same time subjecting the whole to heat so that the rubber material will be vulcanized and caused to coalesce with the adjacent parts under heat and pressure.

15. In combination, a mold for bearing against the outer surfaces of a jar to be formed of material of which the parts forming the inner surfaces are of rubber, and a three-part core for bearing against the inner surface of said jar, said core comprising three parts of which the middle part is wedge-shaped to force apart its two mating parts when it is pressed into position between them and thus to create pressure on the material between the mold and the core and to permit such mating parts to be moved together upon the prior withdrawal of the middle part from its position between them, the mold having side walls which are arranged to permit such movement of such mating core-parts toward and from each other.

16. In combination, a mold for bearing against the outer surfaces of a jar to be formed of material of which the parts forming the inner surfaces are of rubber, and a three-part core for bearing against the inner surface of said jar, said core comprising three parts of which the middle part is wedge-shaped to force apart its two mating parts when it is pressed into position between them and thus to create pressure on the material between the mold and the core and to permit such mating parts to be moved together upon the prior withdrawal of the middle part from its position between them, the mold having side walls which are arranged to permit such movement of such mating core-parts toward and from each other, the engaging faces of the core-parts being provided with tongues and grooves for guiding them in their relative movements.

17. The process of forming a jar provided with handles, which consists in building up the bottom and walls of the jar of sheets of rubber-containing material, pressing the heads of headed members against the outer surface of the walls of such jar, and subjecting the jar to pressure from within and without and at the same time subjecting it to heat whereby the bottom and walls are vulcanized and caused to coalesce and the heads of such headed members are embedded within the walls.

In witness whereof, I have hereunto set my hand at Indianapolis, Indiana, this 24th day of December, A. D. one thousand nine hundred and twenty.

LOUIS E. KLUG.